United States Patent [19]
Lenz et al.

[11] Patent Number: 5,514,489
[45] Date of Patent: May 7, 1996

[54] ELECTROCHEMICAL STORAGE CELL WITH ADDITIONAL CLOSURE SEAL

[75] Inventors: Franz Lenz, Neulussheim; Günther Steinleitner, Schriesheim, both of Germany

[73] Assignee: ABB Patent GmbH, Mannheim, Germany

[21] Appl. No.: 328,073

[22] Filed: Oct. 24, 1994

[30] Foreign Application Priority Data

Oct. 23, 1993 [DE] Germany .......................... 43 36 236.2

[51] Int. Cl.$^6$ ........................... H01M 2/08; H01M 2/14; H01M 2/24
[52] U.S. Cl. .......................... 429/164; 429/104; 429/165; 429/174; 429/185
[58] Field of Search ................................... 429/104, 164, 429/165, 174, 185

[56] References Cited

U.S. PATENT DOCUMENTS

| | | | |
|---|---|---|---|
| 4,401,731 | 8/1983 | Steinleitner | 429/104 |
| 4,473,624 | 9/1984 | Hug et al. | 429/104 |
| 4,564,568 | 1/1986 | Hasenauer et al. | 429/104 |
| 5,196,277 | 3/1993 | Mima et al. | 429/104 |

*Primary Examiner*—Stephen Kalafut
*Assistant Examiner*—Richard H. Lilley, Jr.
*Attorney, Agent, or Firm*—Herbert L. Lerner; Laurence A. Greenberg

[57] ABSTRACT

An electrochemical storage cell is bounded by a metallic casing and has a cup-shaped solid electrolyte on the inside which separates an anode compartment from a cathode compartment. The storage cell is externally closed in a leak-proof and gas-tight manner. A closure of the cell has an additional seal with two mutually overlapping components between which an insulating ring is disposed.

14 Claims, 2 Drawing Sheets

ELECTROCHEMICAL STORAGE CELL WITH ADDITIONAL CLOSURE SEAL

BACKGROUND OF THE INVENTION

1. Field of the Invention

The invention relates to an electrochemical storage cell based on sodium and sulphur, including an anode compartment and a cathode compartment being separated from one another by an alkali metal ion-conductive solid electrolyte and being at least zonally bounded by a metallic casing, and a closure of the storage cell having a retention element being connected to the casing and on which an insulating ring fastened to the solid electrolyte is retained.

Such electrochemical storage cells are highly suitable as energy sources. They are used to an increased extent in the construction of high-power batteries which are provided for the power supply of electric vehicles. Examples thereof are storage cells based on sodium and sulphur, which are rechargeable and have a solid electrolyte made of beta-alumina which separates the anode compartment of the storage cell from the cathode compartment. The storage cell is closed on the outside by sealing elements which are disposed overlappingly and cover the anode compartment and the cathode compartment. Between the sealing elements, a ceramic ring of alpha-alumina is additionally disposed and is firmly connected to the solid electrolyte. The two sealing elements are made out of metal. Aluminum is preferably used for their production in that case. The sealing elements are permanently connected to the ring made of alpha-alumina by means of thermocompression. The drawback of such a device is that, in the event of damage to the closure, sodium, sulphur or sodium polysulphide can flow out of the storage cell. Destruction of the closure can, for example, be caused by strong exothermic reactions inside the storage cell or detachment of the ring made of alpha-alumina from the solid electrolyte. Such a detachment will be caused by corrosion of the glass with which the alpha-alumina ring is connected to the solid electrolyte. Faulty connections between the metallic sealing elements and the ceramic ring can also be the cause thereof.

2. Summary of the Invention

It is accordingly an object of the invention to provide an electrochemical storage cell, which overcomes the hereinafore-mentioned disadvantages of the heretofore-known devices of this general type cell and which has an improved closure.

With the foregoing and other objects in view there is provided, in accordance with the invention, an electrochemical storage cell, based on sodium and sulphur, comprising an anode compartment; a cathode compartment; an alkali metal ion-conductive solid electrolyte separating the anode and cathode compartments from each other; a metallic casing at least zonally bounding the anode and cathode compartments; and a closure for the storage cell having a retention element connected to the casing, an insulating ring retained on the retention element and fastened to the solid electrolyte, and an additional seal.

In accordance with another feature of the invention, the additional seal is formed by two overlapping sealing elements, between which an insulating ring made of ceramic is disposed.

In accordance with a further feature of the invention, the first sealing element is fastened indirectly or directly on the casing, and the second sealing element is fastened on the rod-shaped current collector.

In accordance with an added feature of the invention, the sealing elements are formed as annular discs and are provided with cylindrical appendage elements for the purpose of fastening on the casing and on the current collector, respectively.

In accordance with an additional feature of the invention, the dimensions of the two sealing elements are chosen in such a way that a space between the casing and the rod-shaped current collector is fully covered and externally closed in a leak-proof and gas-tight manner by the insulating ring between the two sealing elements.

In accordance with yet another feature of the invention, the rod-shaped current collector has an outer surface, and the cylindrical appendage of one of the sealing elements zonally encloses and is permanently connected to the outer surface of the rod-shaped current collector.

In accordance with yet a further feature of the invention, the retention element has an inner surface, and the cylindrical appendage of one of the sealing elements is permanently fastened on the inner surface of the retention element.

In accordance with yet an added feature of the invention, the other insulating ring disposed between the two sealing elements is made of alpha-alumina and is connected gas-tightly to the two sealing elements.

In accordance with yet an additional feature of the invention, the insulating ring fastened on the solid electrolyte has a diameter being at least equal to the diameter of the other insulating ring.

In an alternative embodiment of the storage cell of the invention, the two sealing elements are formed by an inwardly pointing flange of an extension fastened on the casing and a sealing element which is also fastened on the current collector. The length of the flange and of the sealing element is chosen to be large enough for the two components to overlap. In this region an insulating ring is also disposed between the flange and the sealing element and is connected by thermocompression to these two components. The sealing elements are made out of aluminum and the insulating rings are made out of alpha-alumina.

In accordance with again another feature of the invention, there is provided a current collector, the additional seal having a first sealing element formed as a flange, a second sealing element formed as an annular disc fastened on the current collector and another insulating ring disposed between the flange and the annular disc, the first and second sealing elements zonally overlapping.

In accordance with again a further feature of the invention, there is provided a cylindrical extension of the casing having first and second ends, the flange pointing into the casing and being located on the second end of the cylindrical extension, and the first end of the cylindrical extension also having a flange pointing into the casing.

In accordance with again an added feature of the invention, the current collector has an outer surface, and the second sealing element is a retention element having a cylindrical appendage zonally surrounding and being fastened on the outer surface of the current collector.

In accordance with again an additional feature of the invention, the insulating ring disposed between the flange and the retention element is made of alpha-alumina, and including one annular aluminum disc interposed between the insulating ring and the flange and another annular aluminum disc interposed between the insulating ring and the retention element, the insulating ring being permanently connected to the flange and to the retention element by thermocompression.

In accordance with still another feature of the invention, there is provided one annular aluminum disc interposed between the insulating ring on the retention element and the flange of the extension and another annular aluminum disc interposed between the insulating ring on the retention element and the retention element, the insulating ring on the retention element being permanently connected to the flange of the extension and to the retention element by thermocompression.

In accordance with a concomitant feature of the invention, the cylindrical extension has an inner surface, the insulating ring on the retention element extends up to the inner surface of the cylindrical extension, and the insulating ring of the additional seal has a width being at most equal to the width of the insulating ring on the retention element.

Other features which are considered as characteristic for the invention are set forth in the appended claims.

Although the invention is illustrated and described herein as embodied in an electrochemical storage cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
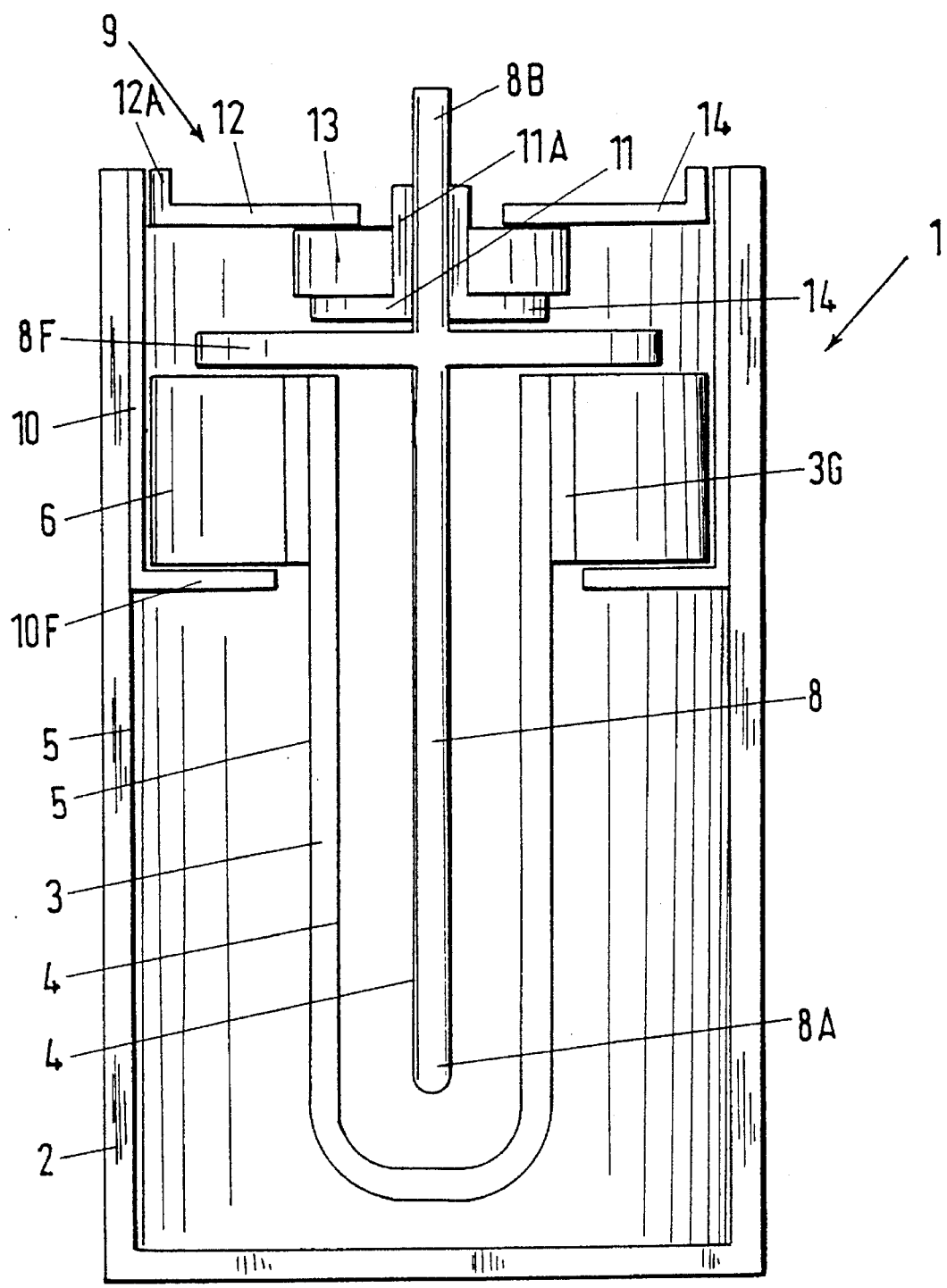
FIG. 1 is a diagrammatic, vertical-sectional view of a storage cell according to the invention.

Referring now to the figures of the drawing in detail and first, particularly, to FIG. 1 thereof, there is seen an electrochemical storage cell 1. The storage cell 1 is externally bounded by a metallic casing 2 which is made from a corrosion-resistant material. Aluminum is preferably used for this purpose. A cup-shaped solid electrolyte 3 is disposed inside the storage cell 1. The solid electrolyte 3 has an internal space which is used as an anode compartment 4. The internal space contains an alkali metal, preferably sodium. The dimensions of the solid electrolyte 3 are chosen in such a way that a coherent annular space 5 is left between inner surfaces of the casing 2 and outer surfaces of the solid electrolyte 3. The annular space 5 is used as a cathode compartment. A sulphur electrode is disposed in the cathode compartment.

A rod-shaped current collector 8 projects into the solid electrode 3. The current collector 8 has a first end 8A which extends until shortly before a closed end of the solid electrolyte 3. The current collector 8 has a second end 8B which extends out of the storage cell 1 and projects several millimeters beyond the latter. The solid electrode 3 has an open end which is provided with an insulating ring that points outwards and acts as a flange 6. In this case the flange 6 is a ring made of alpha-alumina which is permanently connected to an outer upper edge of the solid electrolyte 3 through a special glass 3G. This flange 6 is supported on an inwardly pointing flange 10F of a retention element 10 and is permanently connected to the retention element 10. The retention element 10 is formed in the shape of a cylinder and is made out of a corrosion-resistant material, preferably aluminum. The dimensions of this cylindrical retention element 10 are matched to the inside diameter of the casing 2. The retention element 10 is disposed inside the casing 2 and is permanently connected to the inner surfaces of the casing 2. The retention element 10 is preferably welded to the inner surfaces of the casing. The dimensions of the insulating ring 6 are chosen in such a way that the cathode compartment 5 is fully covered by the ring 6. A flange 8F formed on the rod-shaped current collector 8 is fitted on the surface of the insulating ring 6 and is permanently connected to the insulating ring 6.

A sealing element 11 is disposed approximately 0.5 cm above the flange 8F. The sealing element 11 is formed as an annular disc and is provided with a cylindrical appendage 11A which zonally encloses the rod-shaped current collector 8 and is permanently fastened thereon. An additional sealing element 12, which is formed as an annular disc, is disposed at a distance of approximately 1.0 cm above the sealing element 11. This sealing element 12 also has a cylindrical appendage 12A and is permanently fastened on inner surfaces of the retention element 10 by using the appendage 12A. The sealing elements 11 and 12 are preferably firmly welded on the rod-shaped current collector 8 and on the retention element 10, respectively. The dimensions of the two sealing elements 11 and 12 are chosen in such a way that they overlap zonally. In this region, an insulating ring 13 is disposed between the sealing elements 11 and 12 and is made of alpha-alumina. The diameter of the insulating ring 13 is somewhat larger than the width of the region in which the two components 11 and 12 overlap. However, its diameter can also correspond to that of the insulating ring 6. The two sealing elements 11 and 12 are preferably permanently connected to the insulating ring 13 by means of thermocompression.

A closure 9 of the internal space of the storage cell 1 therefore has an additional seal 14 including the two sealing elements 11 and 12 and the insulating ring 13, so that neither gaseous nor fluid reactants can escape.

Figure 2:
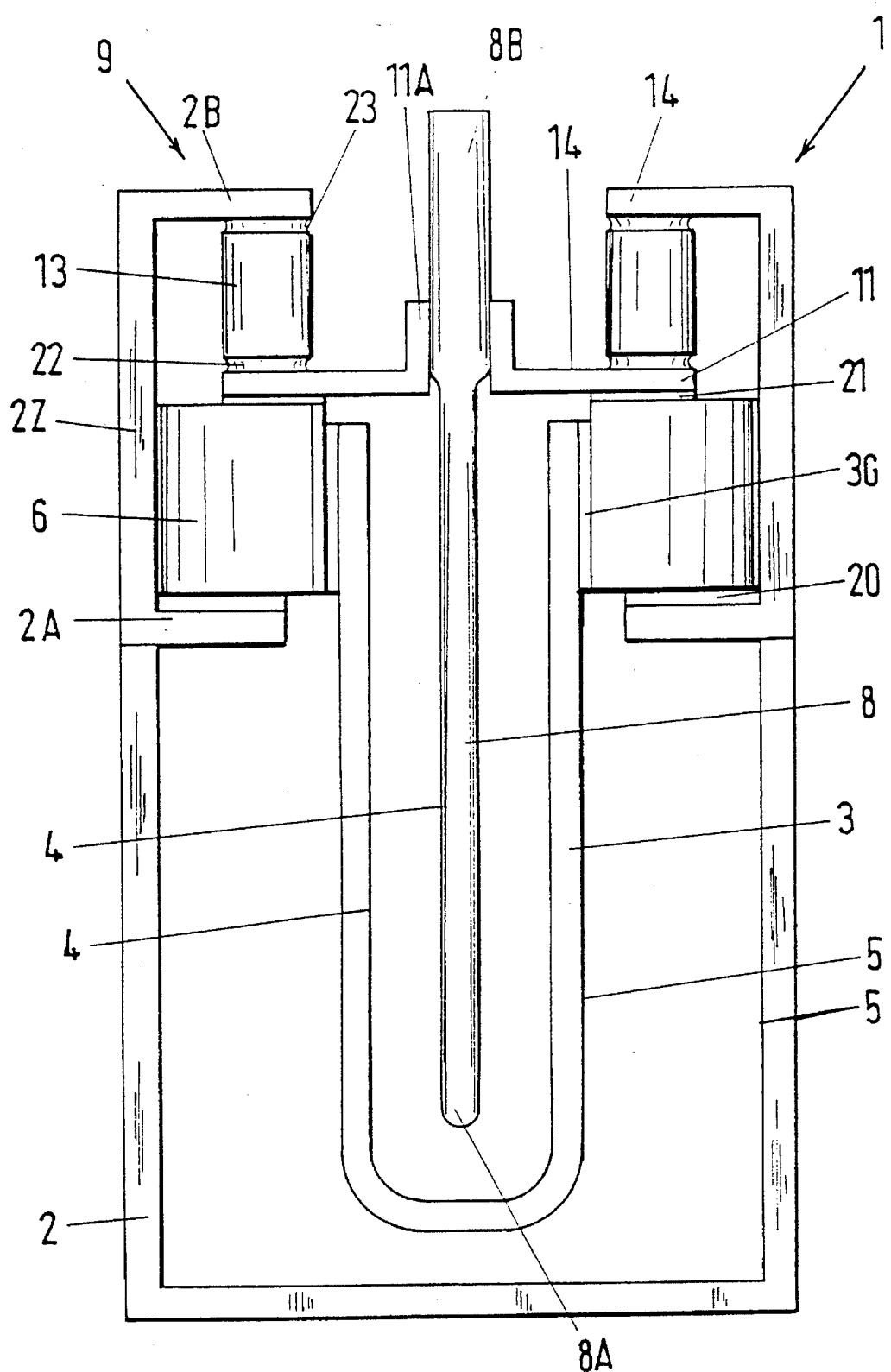
FIG. 2 is a view similar to FIG. 1 of a variant of the storage cell shown therein.

FIG. 2 shows a variant of the storage cell represented in FIG. 1. Identical components are provided with identical reference numbers. As is shown by FIG. 2, the casing 2 has an open end and is provided with a cylindrical extension 2Z in the region of the open end. The extension has first and second ends each being provided with a respective inwardly pointing and rounded first and second flange 2A and 2B. The extension 2Z is permanently connected to the casing 2 and has the same inside diameter and the same wall thickness as the latter. The insulating ring 6 made out of alpha-alumina is fitted on the first flange 2A of the extension 2Z. The insulating ring 6 is fastened on the outer surface of the solid electrolyte 3 by using the glass 3G. In addition, thermocompression is used to connect the insulating ring 6 to the flange 2A through an annular disc 20 which is made of aluminum. The dimensions of the insulating ring 6 in this case are also chosen in such a way that the cathode compartment 5 beginning below the flange 2A is fully covered. The retention element 11 is disposed on the surface of the insulating ring 6. An annular disc 21 made of aluminum is additionally disposed between the insulating ring 6 and the retention element 11. The retention element 11 is formed as an annular disc and has a cylindrical appendage 11A. The appendage 11A zonally surrounds the outer surface of the current collector 8 and is permanently connected to the latter. The current collector 8 may also be made somewhat thicker at the second end 8B, as is represented in FIG. 2, for improving its stability. The length of the retention element 11 is chosen in such a way that the second flange 2B of the extension 2Z and the retention element 11 overlap.

A further insulating ring 13 is disposed between the flange 2B and the retention element 11. The further insulating ring 13 is permanently connected by means of thermocompression to the two components 11 and 13. For this purpose, aluminum annular discs 22, 23 are respectively disposed between the insulating ring 13 and the retention element 11 as well as between the insulating ring 13 and the flange 2B. The annular discs 22, 23 permit connection of the components 2B, 11 and 13 by means of thermocompression. The diameter of the insulating ring 13 is made somewhat wider than the region in which the components 2B and 11 overlap. However, it can also be matched to the diameter of the insulating ring 6. Through the use of the above-described measures, the two insulating rings 6 and 13 are rigidly connected together. The closure 9 of the storage cell 1 can be produced in a single operation and includes an additional seal 14 having a first sealing element formed as the flange 2B, a second sealing element formed as the annular disc 11 and the insulating ring 13 disposed between the flange 2B and the annular disc 11. In contrast thereto, the insulating rings 6 and 13 represented in FIG. 1 are thermally and mechanically decoupled from each other.

We claim:

1. An electrochemical storage cell, based on sodium and sulphur, comprising:

an anode compartment;

a cathode compartment;

an alkali metal ion-conductive solid electrolyte separating said anode and cathode compartments from each other;

a metallic casing bounding said anode and cathode compartments;

a closure for the storage cell having a retention element connected to said casing, an insulating ring retained on said retention element and fastened to said solid electrolyte, and an additional seal;

a rod-shaped current collector projecting into said solid electrolyte, a first one of said sealing elements being fastened on said current collector, and a second one of said sealing elements being fastened at least indirectly on said casing;

both of said sealing elements being formed as annular discs and each being provided with a cylindrical appendage for respectively fastening on said current collector and on said casing;

said retention element having an inner surface, and said cylindrical appendage of one of said sealing elements being permanently fastened on said inner surface of said retention element.

2. The electrochemical storage cell according to claim 1, wherein said additional seal has two overlapping sealing elements and another insulating ring disposed between said sealing elements.

3. The electrochemical storage cell according to claim 1, wherein said rod-shaped current collector and said casing are spaced apart and define a space therebetween, and said two sealing elements are dimensioned for fully covering said space between said rod-shaped current collector and said casing.

4. The electrochemical storage cell according to claim 1, wherein said rod-shaped current collector has an outer surface, and said cylindrical appendage of one of said sealing elements zonally encloses and is permanently connected to said outer surface of said rod-shaped current collector.

5. The electrochemical storage cell according to claim 2, wherein said other insulating ring disposed between said two sealing elements is made of alpha-alumina and is connected gas-tightly to said two sealing elements.

6. The electrochemical storage cell according to claim 2, wherein said insulating ring fastened on said solid electrolyte has a diameter being at least equal to the diameter of said other insulating ring.

7. The electrochemical storage cell according to claim 1, including a current collector, said additional seal having a first sealing element formed as a flange, a second sealing element formed as an annular disc fastened on said current collector and another insulating ring disposed between said flange and said annular disc, said first and second sealing elements zonally overlapping.

8. An electrochemical storage cell, based on sodium and sulphur, comprising:

an anode compartment, a Cathode compartment, an alkali metal ion-conductive solid electrolyte separating said anode and cathode compartments from each other; and a metallic casing bounding said anode and cathode compartments;

a closure for the storage cell having a retention element connected to said casing, an insulating ring retained on said retention element and fastened to said solid electrolyte, and an additional seal;

a current collector, said additional seal having a first sealing element formed as a flange, a second sealing element formed as an annular disc fastened on said current collector and another insulating ring disposed between said flange and said annular disc, said first and second sealing elements overlapping; and a cylindrical extension of said casing having first and second ends, said flange pointing into said casing and being located on said second end of said cylindrical extension, and said first end of said cylindrical extension also having a flange pointing into said casing.

9. The electrochemical storage cell according to claim 7, wherein said current collector has an outer surface, and said second sealing element is a retention element having a cylindrical appendage zonally surrounding and being fastened on said outer surface of said current collector.

10. An electrochemical storage cell, based on sodium and sulphur, comprising:

an anode compartment, a cathode compartment, an alkali metal ion-conductive solid electrolyte separating said anode and cathode compartments from each other; and a metallic casing bounding said anode and cathode compartments;

a closure for the storage cell having a retention element connected to said casing, an insulating ring retained on said retention element and fastened to said solid electrolyte, and an additional seal;

a current collector having an outer surface, said additional seal having a first sealing element formed as a flange, a second sealing element formed as an annular disc fastened on said current collector and another insulating ring disposed between said flange and said annular disc, said first and second sealing elements overlapping;

said second sealing element being a retention element having a cylindrical appendage surrounding and being fastened on said outer surface of said current collector; and wherein said insulating ring disposed between said flange and said retention element is made of alpha-alumina, and including one annular aluminum disc interposed between said insulating ring and said flange and another annular aluminum disc interposed between said insulating ring and said retention element, said insulating ring being permanently connected to said flange and to said retention element by thermocompression.

11. The electrochemical storage cell according to claim 8, including one annular aluminum disc interposed between said insulating ring on said retention element and said flange of said extension and another annular aluminum disc interposed between said insulating ring on said retention element and said retention element, said insulating ring on said retention element being permanently connected to said flange of said extension and to said second sealing element by thermocompression.

12. The electrochemical storage cell according to claim 8, wherein said cylindrical extension has an inner surface, said insulating ring on said retention element extends up to said inner surface of said cylindrical extension, and said insulating ring of said additional seal has a width being at most equal to the width of said insulating ring on said retention element.

13. An electrochemical storage cell, based on sodium and sulphur, comprising:

an anode compartment, a cathode compartment, an alkali metal ion-conductive solid electrolyte separating said anode and cathode compartments from each other, and a metallic casing bounding said anode and cathode compartments;

a closure for the storage cell having a retention element connected to said casing, an insulating ring retained on said retention element and fastened to said solid electrolyte, and an additional seal with two overlapping sealing elements and another insulating ring disposed between said sealing elements;

a rod-shaped current collector projecting into said solid electrolyte, said rod-shaped current collector having an outer surface, a first one of said sealing elements being fastened on said current collector, and a second one of said sealing elements being fastened at least indirectly on said casing, both of said sealing elements being formed as annular discs and being each provided with a cylindrical appendage for respectively fastening on said current collector and on said casing;

said rod-shaped current collector and said casing being spaced apart and defining a space therebetween, said two sealing elements being dimensioned for fully covering said space between said rod-shaped current collector and said casing, said cylindrical appendage of one of said sealing elements enclosing and being permanently connected to said outer surface of said rod-shaped current collector, said retention element having an inner surface, and said cylindrical appendage of one of said sealing elements being permanently fastened on said inner surface of said retention element, said other insulating ring disposed between said two sealing elements being made of alpha-alumina and being connected gas-tightly to said two sealing elements, and said insulating ring fastened on said solid electrolyte having a diameter being at least equal to the diameter of said other insulating ring.

14. An electrochemical storage cell, based on sodium and sulphur, comprising:

an anode compartment, a cathode compartment, an alkali metal ion-conductive solid electrolyte separating said anode and cathode compartments from each other, and a metallic casing at least zonally bounding said anode and cathode compartments;

a closure for the storage cell having a retention element connected to said casing, an insulating ring retained on said retention element and fastened to said solid electrolyte, a current collector with an outer surface, and an additional seal, said additional seal having a first sealing element formed as a flange, a second sealing element formed as an annular disc fastened on said current collector and another insulating ring disposed between said flange and said annular disc, said first and second sealing elements overlapping each other;

a cylindrical extension of said casing having first and second ends, said flange pointing into said casing and being located on said second end of said cylindrical extension, said first end of said cylindrical extension also having a flange pointing into said casing, said second sealing element being a retention element having a cylindrical appendage surrounding and being fastened on said outer surface of said current collector, said insulating ring disposed between said flange and said retention element being made of alpha-alumina;

one annular aluminum disc interposed between said insulating ring and said flange and another annular aluminum disc interposed between said insulating ring and said retention element, said insulating ring being permanently connected to said flange and to said retention element by thermocompression; and one annular aluminum disc interposed between said insulating ring on said retention element and said flange of said extension and another annular aluminum disc interposed between said insulating ring on said retention element and said retention element, said insulating ring on said retention element being permanently connected to said flange of said extension and to said retention element by thermocompression, said cylindrical extension having an inner surface, said insulating ring on said retention element extending up to said inner surface of said cylindrical extension, and said insulating ring of said additional seal having a width being at most equal to the width of said insulating ring on said retention element.

* * * * *